United States Patent [19]
White et al.

[11] Patent Number: 5,348,211
[45] Date of Patent: Sep. 20, 1994

[54] JOINING OF METALLIC PIPE LINED WITH THERMOPLASTIC POLYMER

[75] Inventors: George White, Glenburnie; David C. King, Bath, both of Canada

[73] Assignee: Du Pont Canada Inc., Mississauga, Canada

[21] Appl. No.: 938,162

[22] PCT Filed: May 1, 1991

[86] PCT No.: PCT/CA91/00146
§ 371 Date: Dec. 3, 1992
§ 102(e) Date: Dec. 3, 1992

[87] PCT Pub. No.: WO91/17362
PCT Pub. Date: Nov. 14, 1991

[30] Foreign Application Priority Data
May 2, 1990 [GB] United Kingdom ............... 9009860

[51] Int. Cl.⁵ ............................................. B21K 29/00
[52] U.S. Cl. ................................. 228/120; 29/890.14; 228/138; 285/149
[58] Field of Search ............... 228/120, 138; 285/149; 29/890.14

[56] References Cited
U.S. PATENT DOCUMENTS

| | | | |
|---|---|---|---|
| 2,308,307 | 1/1943 | Robinson | 29/890.14 X |
| 2,724,672 | 11/1955 | Rubin | 156/287 |
| 3,192,612 | 7/1965 | Elliott et al. | 29/157 |
| 3,298,716 | 1/1967 | Taylor et al. | 29/890.14 X |
| 3,560,295 | 2/1971 | Kimbrell et al. | 156/287 |
| 3,965,555 | 6/1976 | Webster et al. | 29/890.14 |

FOREIGN PATENT DOCUMENTS

| | | |
|---|---|---|
| 531102 | 10/1956 | Canada . |
| 1242262 | 8/1988 | Canada . |
| 988197 | 8/1951 | France . |
| 2564938 | 11/1985 | France . |
| 287005 | 4/1928 | United Kingdom . |
| 824717 | 12/1959 | United Kingdom . |
| 1070952 | 6/1967 | United Kingdom . |

*Primary Examiner*—Kenneth J. Ramsey

[57] ABSTRACT

A method of joining two sections of metallic pipe (1), each of which has a thermoplastic polymer lining (3), to form corrosion resistant joints is disclosed. The method comprises inserting a sleeve (10) into each section of two pipes (1) that are to be joined so as to form a fluid tight seal between the liner (3) and the sleeve (10). The end of each section of pipe is then bevelled, and the two sections are welded together so as to form a corrosion resistant weld between each section of pipe and each sleeve and between each of the sleeves. The method is particularly useful in the lining of metallic pipe in the field e.g. in pipelines, without having to form flange joints.

11 Claims, 3 Drawing Sheets

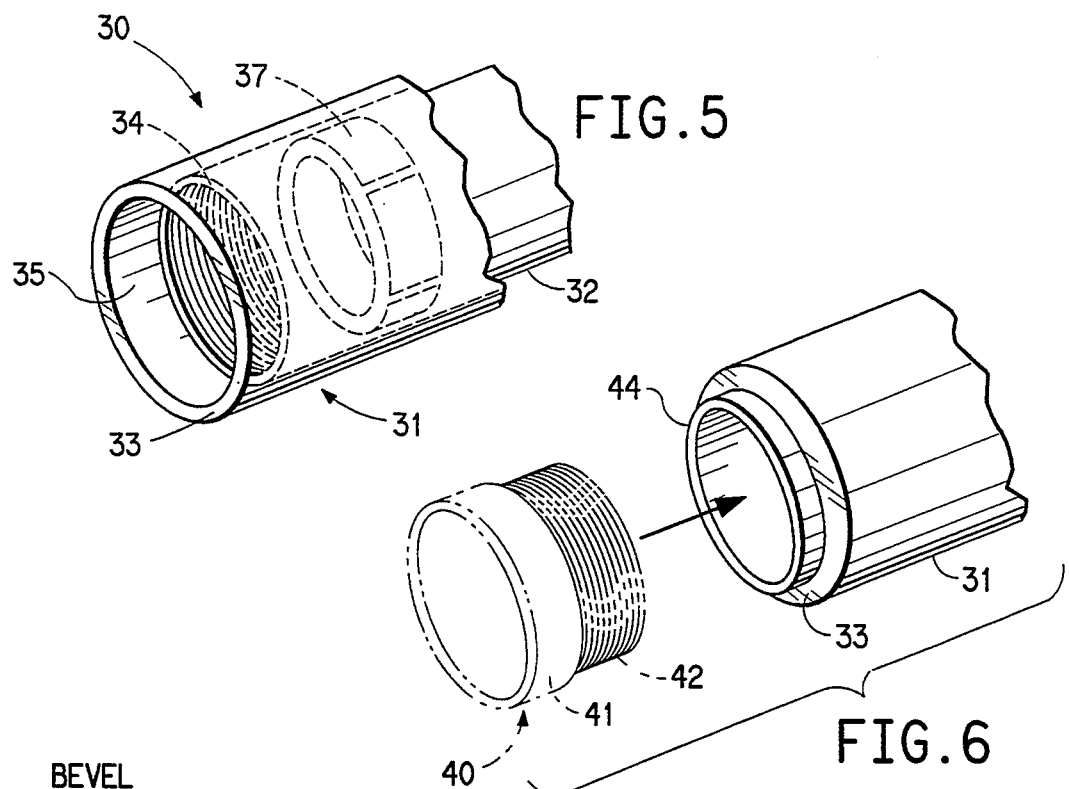
FIG.5
FIG.6
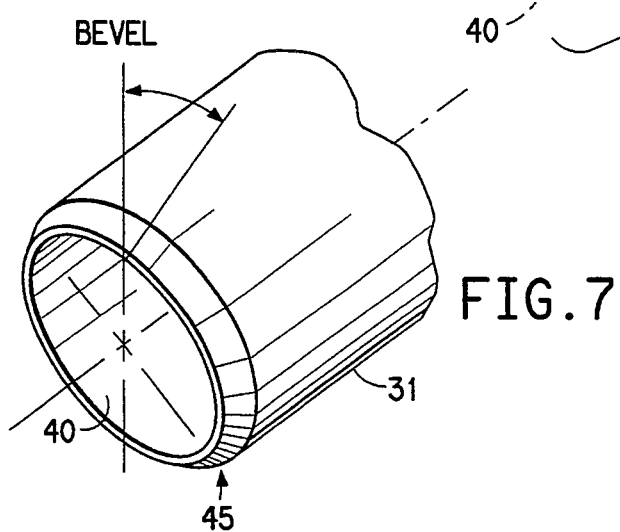
FIG.7
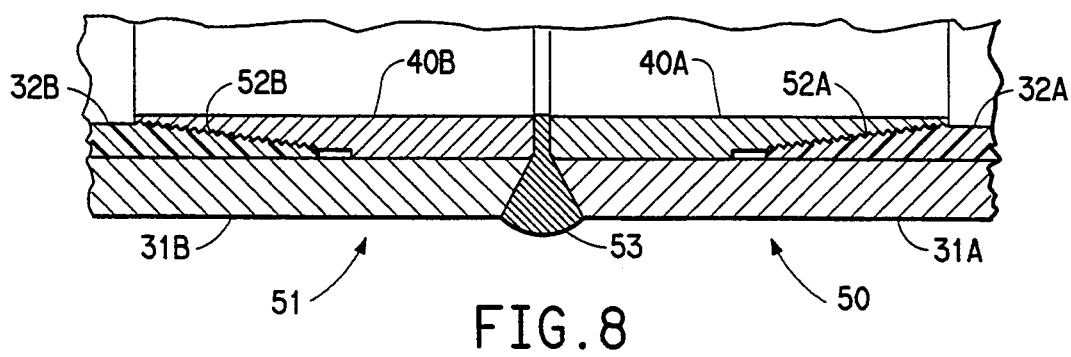
FIG.8

JOINING OF METALLIC PIPE LINED WITH THERMOPLASTIC POLYMER

TECHNICAL FIELD

The present invention relates to a method of joining two sections of metallic pipe each of which is lined with thermoplastic polymer, and in particular to a method of forming corrosion resistant joints in metallic pipe that is lined with a thermoplastic polymer.

BACKGROUND ART

Metallic pipe, especially steel pipe, is used in the transportation of fluids. A primary example is the use of steel pipelines for the transportation of petroleum products, including crude oil and petroleum gases. Crude oil may contain brine, and in some instances contains 70–90% brine. Such pipelines may be used to transport fluids over long distances through harsh terrain e.g. the transportation of petroleum products from the Arctic. Pipelines are susceptible to corrosion, for example as a result of moisture and acidic materials in the petroleum products, which can severely limit the useful life of a pipeline.

Pipelines may be protected by lining the metallic pipe with a thermoplastic polymer, and use of a variety of polymers is known in the art. Canadian 531 102 of J. M. Reilly, issued Oct. 2, 1956, relates to the lining of rigid pipe with an elastic thermoplastic material. U.S. Pat. No. 2,724,672 of L. C. Rubin, which issued Nov. 22, 1955, describes the lining of metal pipe with fluorocarbon polymers. The lining of metal pipe with polyvinylchloride is described in U.S. Pat. No. 3,560,295 of W. B. Kimbrell et al., which issued Feb. 2, 1971. The lining of pipe with, in particular, polyethylene is described in Canadian 1 241 262 of A. D. Whyman and D. A. Kneller, which issued Aug. 30, 1988.

Sections of pipe lined with a thermoplastic polymer cannot be merely welded together to form an acceptable weld. The temperatures required in order to obtain a weld between the metallic sections of the pipe are such that the liner would become degraded, and have a substantially shortened useful life.

Techniques have been developed for the joining of sections of metallic pipe that have been lined with thermoplastic polymers. For example, in U.S. Pat. No. 3,192,612, which issued Jul. 6, 1965, R. W. Elliott et al. describe a method involving removal of the end of the metal section of the pipe so as to leave the liner extending beyond the metal section, heating the extended end of the liner sufficiently to soften the liner to enable it to be turned back over the metal section, and threading a pipe member over the liner. Methods are also known in which the polymer linking is removed from the end of the pipe section that is to welded, and then replaced with thermoplastic polymer e.g. using expandible rings of polymer, powder coatings or the like, but these methods have generally been unsatisfactory. Flanges may be used, but flanges of acceptable strength tend to be very expensive. French A-988 197 of N. V. De Plaatwellerij, published Aug. 23, 1951, relates to welded joints for pipes or tubes coated with e.g. asphalt. French A-2 564 938 of P. L. Lescant, corresponding to U.S. Pat. No. 4,611,833, describes joining of pipes internally coated with heat sensitive material.

DISCLOSURE OF INVENTION

A method has now been found for joining two sections of metallic pipe having a liner of a thermoplastic polymer, especially a method that is adaptable for use in the field.

Accordingly, the present invention provides a method of joining two sections of metallic pipe having a liner of a thermoplastic polymer, the ends of each section of the pipe extending beyond the end of the liner, characterized by comprising the steps of:

(a) inserting a sleeve formed from a corrosion-resistant material into the first section of the pipe so as to form a fluid-tight seal between the sleeve and the liner;

(b) inserting a sleeve formed from a corrosion-resistant material into the second section of the pipe so as to form a fluid-tight seal between the sleeve and the liner;

(c) bevelling the end of the pipe section; and (d) welding two sections of such pipe together using corrosion resistant material so as to form a continuous weld between the sleeves in each section of the pipe and between each sleeve and the metallic pipe, thereby joining said sections together.

In a preferred embodiment of the present invention, the sleeve is wholly contained within the section of pipe.

In a another preferred embodiment of the present invention, the sleeve extends beyond the end of the section of pipe, and preferably both the sleeve and pipe end are bevelled to form a common bevelled end.

In a further embodiment, the sleeve is threaded or swaged to facilitate the formation of the fluid tight seal.

In another embodiment, the thermoplastic polymer is a polyamide.

BRIEF DESCRIPTION OF DRAWINGS

The present invention will be particularly described with reference to the embodiments shown in the drawings in which:

FIG. 5 is a schematic representation of an end section of a lined metallic pipe, for a second embodiment of the invention;

FIG. 6 is a schematic representation of insertion of a sleeve into the end of the lined metallic pipe of FIG. 5;

FIG. 7 is a schematic representation of the metallic pipe of FIG. 6 containing the sleeve; and FIG. 8 is a schematic representation of a longitudinal-section through two sections of lined metallic pipe of FIG. 7 that have been welded together.

DETAILED DESCRIPTION OF INVENTION

Figure 1:
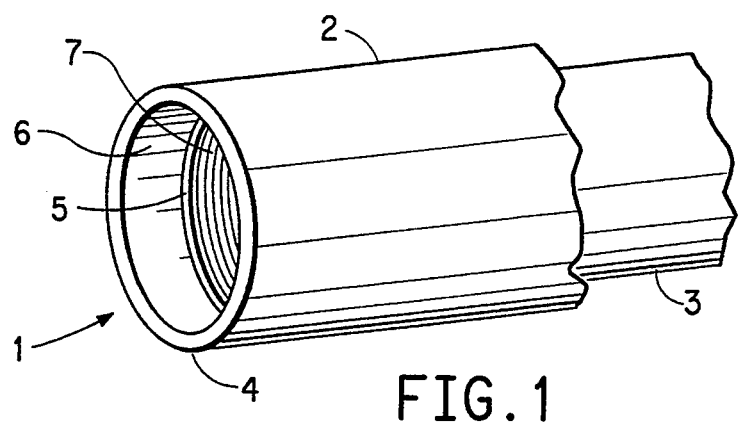
FIG. 1 is a schematic representation of an end section of a lined metallic pipe, for one embodiment of the invention.

FIG. 1 shows a section of a lined metallic pipe, generally indicated by 1. Lined metallic pipe 1 is formed from metallic pipe 2 and liner 3 of thermoplastic polymer. Pipe end 4 is shown as being a transverse cut of metallic pipe 2; it is to be understood that the end of the metallic pipe 2 needs to be cut in a manner that permits two such sections of metallic pipe 2 to be placed end-to-end in an abutting relationship. Liner end 5 is shown as being spaced apart from pipe end 4, thereby leaving a section of unlined pipe 6.

In the embodiment shown in FIG. 1, the internal surface of liner 3 is shown as having liner threads 7. Liner threads 7 may facilitate the insertion of a sleeve into liner 3, as described below, but while the method of the present invention generally does not require the use of such liner thread 7, it may be advantageous to use threads with some polymers. Nonetheless, in preferred embodiments of the invention, liner 3 does not have liner threads 7.

Figure 2:
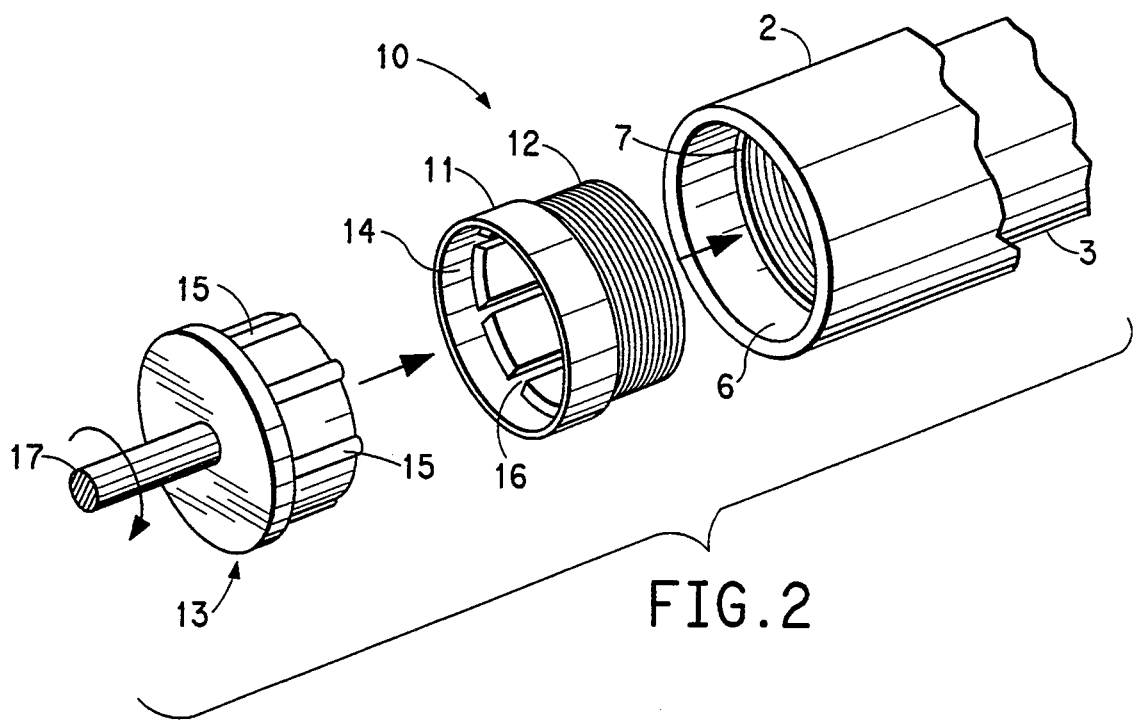
FIG. 2 is a schematic representation of insertion of a sleeve into the end of the lined metallic pipe of FIG. 1.

FIG. 2 shows a sleeve, generally indicated by 10. Sleeve 10 has an outer section 11 that is adapted to fit inside unlined pipe section 6 of lined metallic pipe 1; the outer diameter of outer section 11 should be substantially the same as the internal diameter of metallic pipe 2, so that sleeve 10 will snugly fit inside metallic pipe 1. Sleeve 10 has threads 12 on the end adjacent to lined metallic pipe 1. Threads 12 are adapted to insert into and mate with liner 3, to form a fluid-tight seal between threads 12 and liner 3. In alternative embodiments, the threads 12 may be in the form of swaging or other rings adapted to form a fluid-tight seal between the liner and the sleeve. An adhesive may be applied to the threads 12 in order to increase the strength of the bond formed between the threads 12 and liner 3.

Tool 13 is adapted for the insertion of sleeve 10 into lined metallic pipe 1. Tool 13 has male lugs 15 that are adapted to insert and mate with female slots 16 located on the internal surface of sleeve 10. Tool 13 has a shaft 17 opposed to male lugs 15 that is adapted for insertion of tool 13 into sleeve 10 and for rotation of tool 13.

Figure 3:
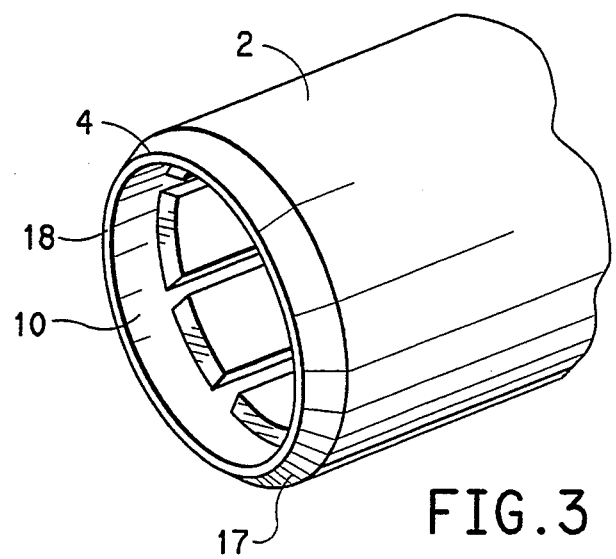
FIG. 3 is a schematic representation of the metallic pipe of FIG. 2 containing the sleeve.

FIG. 3 shows metallic pipe 2 having sleeve 10 inserted therein. Metallic pipe 2 is also shown as having a bevelled edge 17 located adjacent to and formed at pipe end 4. Bevelled edge 17 is shown as being substantially flush with the end 18 of sleeve 10.

Figure 4:
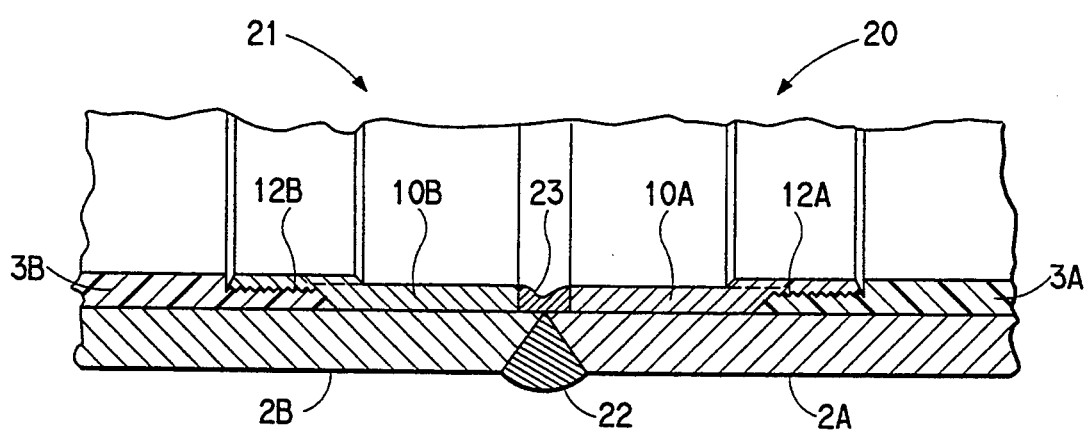
FIG. 4 is a schematic representation of a longitudinal-section through two sections of lined metallic pipe of FIG. 3 that have been welded together.

FIG. 4 is a longitudinal section of two sections of pipe, indicated as pipe sections 20 and 21, that have been welded together. The pipe sections are formed of metallic pipe 2A and 2B, respectively, having sleeves 10A and 10B bonded to liners 3A and 3B. Sleeves 10A and 10B have a fluid-tight seal with liners 3A and 3B, respectively, formed at 12A and 12B. Pipe sections 20 and 21 are shown as being welded together, by welds 22 and 23. Weld 22 is formed at and between the external surfaces of metallic pipe 2A and 2B. Weld 23 is formed on the interior of metallic pipe 2A and 2B, between sleeves 10A and 10B, joining sleeves 10A and 10B together and joining each sleeve to the metallic pipe to form a continuous corrosion-resistant weld between the metallic pipes.

In operation of the embodiment shown in FIGS. 1–4, a lined metallic pipe is cut so as to form a pipe end having a section of unlined pipe 6 in metallic pipe 1 lined with a liner 3. Sleeve 10 having threads 12 is then inserted into metallic pipe 2 using a tool such as tool 13. Sleeve 10 is of a size and is inserted in such a manner so as to form a fluid-tight seal between threaded section 12 of sleeve 10 and liner 3. A bevelled edge 17 is then formed at pipe end 4; while the method has been particularly described with respect to the formation of the bevelled edge 17 after insertion of sleeve 10, the bevelled edge 17 may be formed prior to insertion of sleeve 10. Two sections of pipe containing sleeve 10 and with bevelled edges 17 are then placed in a face-to-face substantially abutting position. The two sections are then welded together using a corrosion resistant welding material by welding from the outside of the pipe. A weld 22 is then formed between bevelled edges 17 on the external portion of each of the two pipe sections. The welding material flows through any gaps between the abutting pipe sections; the abutting relationship between the pipe sections should permit flow of welding material between the pipe sections so as to form a continuous internal weld 23 between sleeves 10A and 10B for the entire circumference of the pipe sections. Thus, a continuous weld is formed between sleeves 10A and 10B and metallic pipe 2A and 2B, such that fluid passing through the resultant pipeline does not come in contact with metallic pipe 2A and 2B.

FIG. 5 shows another embodiment having a section of a lined metallic pipe, generally indicated by 30, formed from metallic pipe 31 and liner 32 of thermoplastic polymer. Pipe end 33 is shown as being a transverse cut of metallic pipe 31, to permit two such sections of metallic pipe 31 to be placed end-to-end in an abutting relationship during subsequent welding of the pipe sections. Liner end 34 is shown as being spaced apart from pipe end 33, thereby leaving a section of unlined pipe 35. An expanding clamp ring 37 is shown within liner 35 spaced a short distance away from liner end 34, clamp ring 37 being adapted to hold the liner in a desired position during steps to bevel the end 33 of the pipe; clamp ring 37 may be expanded by use of a conical device inserted into the pipe (not shown).

FIG. 6 shows a sleeve 40 having an outer section 41 that is adapted to fit inside unlined pipe section 35 of lined metallic pipe 30 (shown in FIG. 5), the outer diameter of outer section 41 being such that sleeve 40 will snugly fit inside metallic pipe 30. Sleeve 40 has threads 42 on the end to be inserted into lined metallic pipe 30. Threads 42 are adapted to insert into and mate with liner 32 (shown in FIG. 5), to form a fluid-tight seal between threads 42 and liner 32; alternative embodiments have been discussed above. An adhesive may be applied to the threads 42 in order to increase the strength of the bond formed between the threads 42 and liner 32. When inserted into metallic pipe 31, sleeve end 44 protrudes beyond pipe end 33 of metallic pipe 31. A method for insertion of sleeve 40 into metallic pipe 31 has been described with reference to FIGS. 1–4.

The embodiment shown in FIG. 6 shows threads 42 on sleeve 40. In a preferred embodiment of the invention, threads 42 are omitted from sleeve 40. In that embodiment, a fluid tight seal between sleeve 40 and liner 32 may be achieved, in the absence of threads, by hydraulic means that form sleeve 40 into liner 32 to an extent such that the fluid tight seal is formed.

FIG. 7 shows metallic pipe 31 having sleeve 40 inserted therein. Metallic pipe 31 and sleeve 40 are shown as having a common bevelled edge 45, formed in pipe end 33 and sleeve end 44.

FIG. 8 is a longitudinal section of two sections of pipe, indicated as pipe sections 50 and 51, that have been welded together. The pipe sections are formed of metallic pipe 31A and 31B, respectively, having sleeves 40A and 40B bonded to liners 32A and 32B. Sleeves 40A and 40B have a fluid-tight seal with liners 32A and 32B, respectively, formed at 52A and 52B. Pipe sections 50 and 51 are shown as being welded together, by weld 53. Weld 53 is formed at end between the external surfaces of metallic pipe 31A and 31B and extends between sleeves 40A and 40B, joining sleeves 40A and 40B together and joining each sleeve to the metallic pipe to form a continuous corrosion-resistant weld between the metallic pipes.

In operation of the embodiment shown in FIGS. 5-8, a lined metallic pipe is cut so as to form a pipe end having a section of unlined pipe 35 in metallic pipe 30 lined with a liner 32. Sleeve 40 is then inserted into metallic pipe 31, so as to form a fluid-tight seal between threaded section 42 of sleeve 40 and liner 32. A bevelled edge 45 is then formed, a common bevelled edge 45 being formed in pipe end 33 and sleeve end 44. Two sections of the resultant pipe are then placed in a face-to-face substantially abutting position, and then welded together using a corrosion resistant welding material by welding from the outside of the pipe. Weld 53 is formed between bevelled edges 45 on the external portion of each of the two pipe sections.

The pipe that may be joined using the method of the present invention is a metallic pipe, especially a steel pipe. In preferred embodiments, the pipe is formed from a carbon steel or other steel used in the formation of pipelines, especially pipelines used for the transportation of petroleum products.

The liner is formed from a thermoplastic polymer, especially a thermoplastic polymer that is corrosion resistant with respect to the intended end use of the lined pipe. In preferred embodiments, the liner is a polyethylene, especially a copolymer of ethylene and a $C_4$–$C_{10}$ higher alpha-olefin. The thermoplastic polymer may also be a polyamide, examples of which are nylon 11, nylon 12 and nylon 12/12. A preferred polymer is nylon 12/12.

The sleeve is formed from a corrosion resistant metal, the preferred example being a stainless steel. The sleeve should be of sufficient length so that the temperature of the liner during the welding process remains below the softening point of the polymer.

The weld is formed from a corrosion resistant material that must be capable of being bonded both to the sleeve and to the pipe. In preferred embodiments the weld is a stainless steel. The welding material must be selected so that a continuous weld is formed with and between the sleeves without weld lines that are unduly susceptible to initiation of corrosion.

Industrial Applicability

The method of the present invention may be used in the joining of metallic pipes having thermoplastic liners. In particular, the method may be used in the joining of lined pipelines in the field in a simple and economical manner that is adaptable for use in difficult terrain.

We claim:

1. A method of joining two sections of metallic pipe having a liner of a thermoplastic polymer, the ends of each section of the pipe extending beyond the end of the liner, characterized by comprising the steps of:
   (a) inserting a sleeve formed from a corrosion-resistant material into the first section of the pipe so as to form a fluid-tight seal between the sleeve and the liner;
   (b) inserting a sleeve formed from a corrosion-resistant material into the second section of the pipe so as to form a fluid-tight seal between the sleeve and the liner;
   (c) bevelling the end of the pipe section; and
   (d) welding two sections of such pipe together using corrosion resistant material so as to form a continuous weld between the sleeves in each section of the pipe and between each sleeve and the metallic pipe, thereby joining said sections together.

2. The method of claim 1 in which the sleeve is wholly contained within the section of pipe.

3. The method of claim 1 in which the sleeve extends beyond the end of the section of pipe.

4. The method of claim 3 in which both the sleeve and pipe end are bevelled to form a common bevelled end.

5. The method of claim 1 in which the sleeve is threaded or swaged to facilitate the formation of the fluid tight seal.

6. The method of claim 1 in which the thermoplastic polymer is a polyamide.

7. The method of claim 6 in which the polyamide is selected from the group consisting of nylon 11, nylon 12 and nylon 12/12.

8. The method of claim 1 in which the thermoplastic polymer is a polyolefin.

9. The method of claim 8 in which the thermoplastic polymer is polyethylene.

10. The method of claim 1 in which the metallic pipe is a steel pipe.

11. The method of claim 10 in which the weld is formed from a stainless steel.

* * * * *